United States Patent
Saiki

(10) Patent No.: US 9,870,102 B2
(45) Date of Patent: Jan. 16, 2018

(54) INPUT DEVICE AND ELECTRONIC DEVICE

(71) Applicant: KYOCERA Document Solutions Inc., Osaka (JP)

(72) Inventor: Katsushi Saiki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/012,204

(22) Filed: Feb. 1, 2016

(65) Prior Publication Data

US 2016/0231868 A1 Aug. 11, 2016

(30) Foreign Application Priority Data

Feb. 6, 2015 (JP) ................................ 2015-022246

(51) Int. Cl.
*G06F 3/043* (2006.01)
*G06F 3/041* (2006.01)
*G06F 3/045* (2006.01)

(52) U.S. Cl.
CPC ............ *G06F 3/0433* (2013.01); *G06F 3/045* (2013.01); *G06F 3/0414* (2013.01); *G06F 2203/04105* (2013.01)

(58) Field of Classification Search
CPC ....... G06F 3/0433; G06F 3/045; G06F 3/0414
See application file for complete search history.

(56) References Cited

U.S. PATENT DOCUMENTS

| 4,992,630 A * | 2/1991 | Mletzko | .................. G06F 3/041 178/18.02 |
| 5,635,683 A * | 6/1997 | McDermott | .......... G06F 3/0414 178/19.04 |
| 2003/0189552 A1* | 10/2003 | Chuang | .................... G06F 3/045 345/173 |
| 2006/0132455 A1* | 6/2006 | Rimas-Ribikauskas | G06F 3/0414 345/173 |
| 2008/0303799 A1* | 12/2008 | Schwesig | .............. G06F 3/0414 345/173 |

(Continued)

FOREIGN PATENT DOCUMENTS

JP 2009-252206 A 10/2009

*Primary Examiner* — Nicholas Lee
*Assistant Examiner* — Robert Stone
(74) *Attorney, Agent, or Firm* — Studebaker & Brackett PC

(57) ABSTRACT

An input device includes a display section, a touch panel, a pressed position detecting section, a pressing force detecting section, a storage section, and a control section. The touch panel includes a plurality of electrodes. The pressed position detecting section determines whether or not the touch panel is pressed according to a resistance between two electrodes among the electrodes and a pressing determination threshold. The pressed position detecting section detects a pressed position where the touch panel is pressed. The pressing force detecting section detects a determination pressing force at a time when the pressed position detecting section determines a pressing. The storage section stores therein the pressed position and the determination pressing force in association with the pressed position. The control section changes the pressing determination threshold in correspondence with the pressed position according to the pressed position and the determination pressing force stored in the storage section.

15 Claims, 7 Drawing Sheets

(56) References Cited

U.S. PATENT DOCUMENTS

| | | | | |
|---|---|---|---|---|
| 2010/0225604 A1* | 9/2010 | Homma | ............... | G06F 3/0414 345/173 |
| 2011/0304567 A1* | 12/2011 | Yamamoto | ............ | G06F 3/0416 345/173 |
| 2013/0307809 A1* | 11/2013 | Sudou | ................... | G06F 3/0414 345/173 |
| 2013/0321317 A1* | 12/2013 | Hirukawa | ............... | G06F 3/016 345/173 |
| 2014/0009413 A1* | 1/2014 | Su | ....................... | G06F 3/0414 345/173 |
| 2014/0043276 A1* | 2/2014 | Takenaka | ................ | A63F 13/12 345/173 |
| 2014/0085234 A1* | 3/2014 | Kawai | ................... | G06F 3/0418 345/173 |
| 2014/0085244 A1* | 3/2014 | Nishigai | ............... | G06F 3/0414 345/173 |
| 2014/0111456 A1* | 4/2014 | Kashiwa | ............. | G06F 3/04883 345/173 |
| 2015/0049064 A1* | 2/2015 | Shin | ..................... | G06F 3/0418 345/178 |

* cited by examiner

| Pressed position P | Determination pressing force N | Region |
|---|---|---|
| $X_1, Y_1$ | 0.31N | A |
| $X_2, Y_2$ | 0.25N | C |
| $X_3, Y_3$ | 0.12N | D |
| $X_4, Y_4$ | 0.11N | B |
| $X_5, Y_5$ | 0.28N | C |
| $X_6, Y_6$ | 0.05N | E |
| $X_7, Y_7$ | 0.10N | F |
| $X_8, Y_8$ | 0.45N | A |
| $X_9, Y_9$ | 0.42N | C |
| $X_{10}, Y_{10}$ | 0.31N | G |

P1 corresponds to rows $X_1,Y_1$ through $X_4,Y_4$; P2 corresponds to rows $X_5,Y_5$ onward.

INPUT DEVICE AND ELECTRONIC DEVICE

INCORPORATION BY REFERENCE

The present application claims priority under 35 U.S.C. §119 to Japanese Patent Application No. 2015-022246, filed on Feb. 6, 2015. The contents of this application are incorporated herein by reference in their entirety.

BACKGROUND

The present disclosure relates to input devices and electronic devices.

An image forming apparatus such as a printer or a multifunction peripheral includes an input device with a touch panel. User pressing on the touch panel can specify a setting relating to the image forming apparatus or operation that the image forming apparatus is to perform.

A resistive touch screen panel has been known as an example of touch panels that detect a pressed position. In the resistive touch screen panel, voltage is applied to one of resistive films located opposite to each other. A pressed position is detected based on voltage generated in response to contact between two resistive films at the pressed position. Another touch panel determines user pressing on the touch panel according to the magnitude of electric current detected by a controller and then detects the pressed position.

SUMMARY

An input device according to the present disclosure includes a display section, a touch panel, a pressing position detecting section, a pressing force detecting section, a storage section, and a control section. The display section displays a screen. The touch panel is mounted on the display section. The touch panel includes a plurality of electrodes. The touch panel detects a resistance between two electrodes among the plurality of electrodes. The pressed position detecting section determines whether or not the touch panel is pressed according to the resistance between the two electrodes and a pressing determination threshold. The pressed position detecting section detects a pressed position where the touch panel is pressed. The pressing force detecting section detects a determination pressing force at a time when the pressed position detecting section determines that the touch panel is pressed. The storage section stores therein the pressed position and the determination pressing force in association with the pressed position. The control section changes the pressing determination threshold in correspondence with the pressed position according to the pressed position and the determination pressing force stored in the storage section.

An electronic device according to the present disclosure includes the above input device.

DETAILED DESCRIPTION

Figure 1:
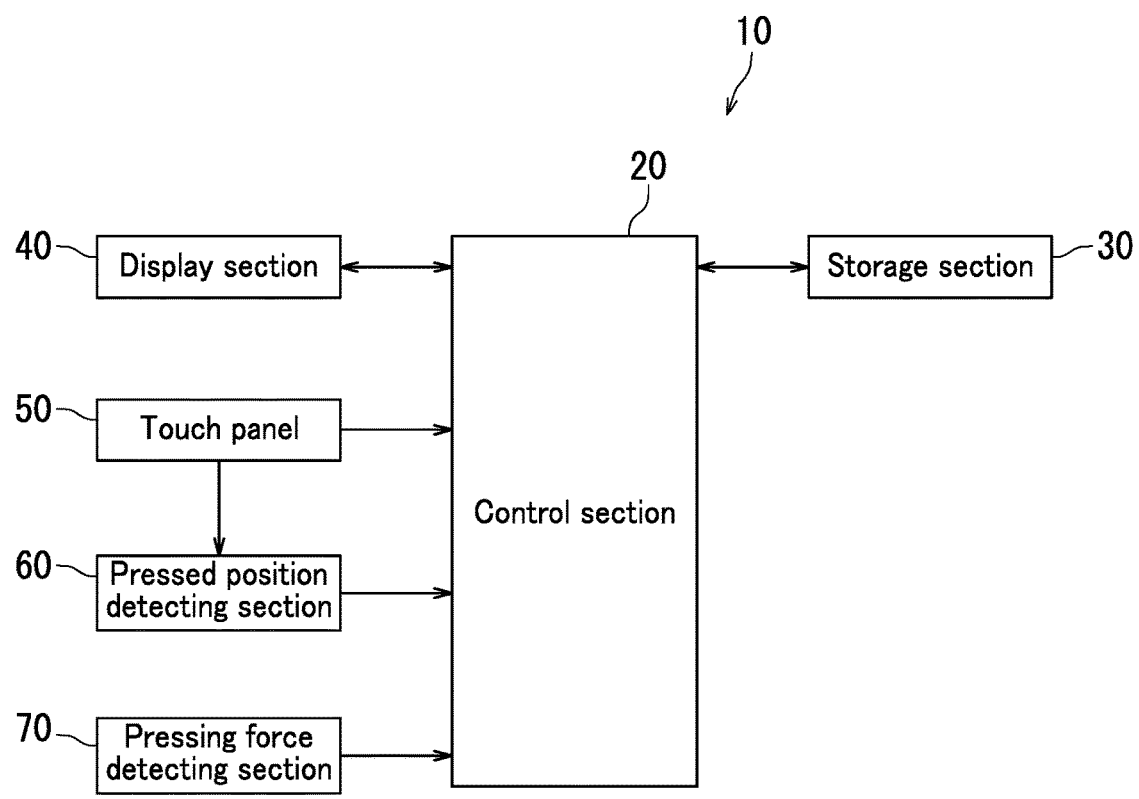
FIG. 1 is a block diagram of an input device according to an embodiment of the present disclosure.

The following describes embodiments of the present disclosure with reference to the accompanying drawings. Like reference signs denote like elements or corresponding elements in the drawings, and description thereof is not repeated.

With reference to FIG. 1, a description will be made below about an input device 10 according to an embodiment of the present disclosure. FIG. 1 is a block diagram of the input device 10 according to the embodiment of the present disclosure.

The input device 10 includes the control section 20, the storage section 30, the display section 40, the touch panel 50, the pressed position detecting section 60, and the pressing force detecting section 70.

The display section 40 displays a screen. The display section 40 may be a liquid crystal panel, for example.

The touch panel 50 is disposed on the display section 40. The touch panel 50 includes a plurality of electrodes. The touch panel 50 detects a resistance between two electrodes among the plurality of electrodes.

The pressed position detecting section 60 determines whether or not the touch panel 50 is pressed according to the resistance between the two electrodes and a pressing determination threshold Th. The pressing determination threshold Th is for determining whether or not the touch panel 50 is pressed. The touch panel 50 employs an analog resistive touch screen panel for detecting a pressed position P in the touch panel 50. Specifically, when the resistance between the two electrodes is no greater than the pressing determination threshold Th, the pressed position detecting section 60 determines that the touch panel 50 is pressed. By contrast, when the resistance between the two electrodes is greater than the pressing determination threshold Th, the pressed position detecting section 60 determines that the touch panel 50 is not pressed. The pressed position detecting section 60 also detects a pressed position P based on voltage generated in response to contact between the two electrodes at the pressed position P.

The pressing force detecting section 70 detects a determination pressing force N at a time when the pressed position detecting section 60 determines a pressing. That is, the pressing force detecting section 70 detects a pressing force necessary for determination that the touch panel 50 is pressed. The pressing force detecting section 70 is a pressure sensor. Alternatively, the pressing force detecting section 70 may detect a determination pressing force N based on surface acoustic waves. Detection of a determination pressing force N based on the surface acoustic waves will be described later with reference to FIG. 5.

The storage section 30 stores therein a pressed position P and a determination pressing force N in association with the pressed position P. The storage section 30 includes a read only memory (ROM), a random access memory (RAM), and a secondary storage device. The secondary storage device may be a non-volatile storage device such as a hard disk or a flash memory. The ROM of the storage section 30 stores therein various types of computer programs that the control section 20 executes.

The control section 20 changes the pressing determination threshold Th in correspondence with a pressed position P according to the pressed position P and the determination pressing force N stored in the storage section 30. The control section 20 may be a central processing unit (CPU), for example.

Figure 2A:
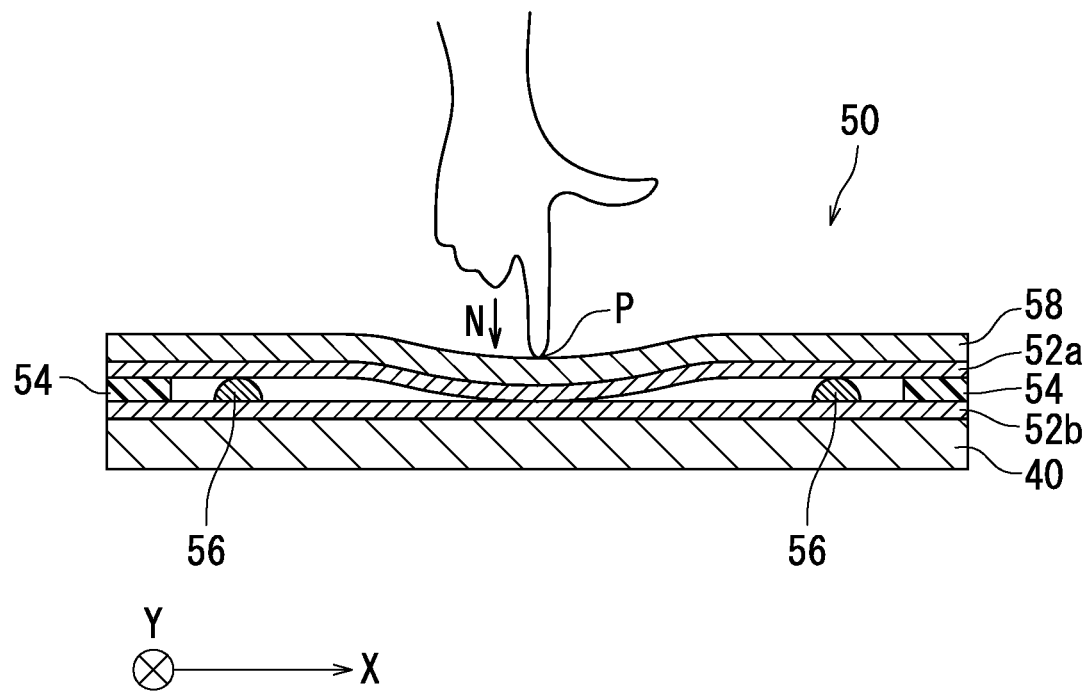
FIG. 2A is a cross sectional view illustrating a touch panel and a display section of the input device according to the embodiment of the present disclosure.
Figure 2B:
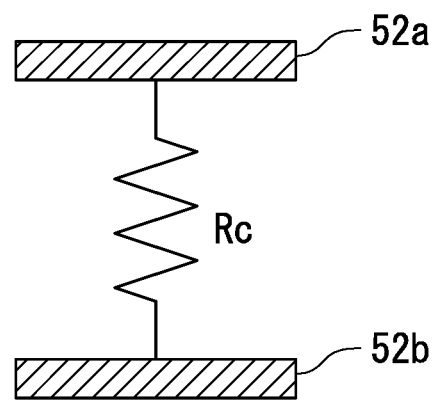
FIG. 2B schematically illustrates contact resistance.

With reference to FIGS. 1, 2A, and 2B, a description will be made about the input device 10 according to the present disclosure. FIG. 2A is a cross sectional view illustrating the touch panel 50 and the display section 40 of the input device 10 according to the embodiment of the present disclosure. FIG. 2B is a schematically illustrates contact resistance Rc.

As illustrated in FIG. 2A, the touch panel 50 includes an upper electrode 52a, a lower electrode 52b, an insulator 54, a spacer 56, and a film 58.

The upper and lower electrodes 52a and 52b each are a transparent electrode film. The upper and lower electrodes 52a and 52b each have transmissivity. The upper and lower electrodes 52a and 52b are made from indium tin oxide (ITO).

The upper and lower electrodes 52a and 52b are layered one on the top of the other in a vertical direction with the insulator 54 and the spacer 56 therebetween so as to be spaced by a predetermined distance. The film 58 having transmissivity is disposed on the upper electrode 52a. The display section 40 is located under the lower electrode 52b.

When a user presses the film 58 at a pressed position P, the upper electrode 52a comes in contact with the lower electrode 52b at a location corresponding to the pressed position P. Contact between the upper and lower electrodes 52a and 52b generates a contact resistance Rc between the upper and lower electrodes 52a and 52b, as illustrated in FIG. 2B.

In a situation in which a force pressing the touch panel 50 is great, the contact area between the upper and lower electrodes 52a and 52b increases and the contact resistance Rc is accordingly low. In a situation in which a force pressing the touch panel 50 is small, the contact area between the upper and lower electrodes 52a and 52b is small and the contact resistance Rc is accordingly high. When the contact resistance Rc is no greater than the pressing determination threshold Th, the pressed position detecting section 60 determines that the touch panel 50 is pressed. The pressed position detecting section 60 detects as the pressed position P, a touch position at a time when the pressed position detecting section 60 determines that the touch panel 50 is pressed.

Figures 3A, 3B:
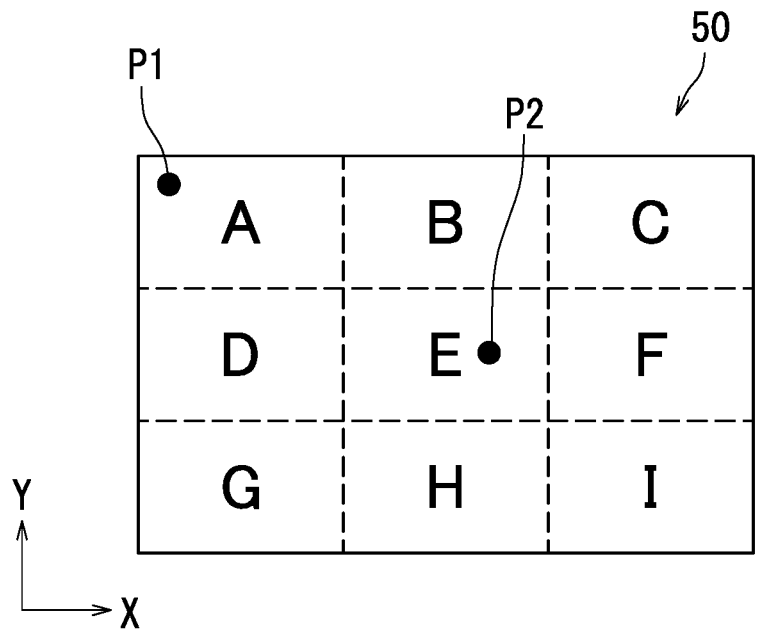
FIG. 3A is a schematic diagram illustrating regions of the touch panel.
FIG. 3B is a list indicating pressing force data stored in a storage section.
Figure 4A:
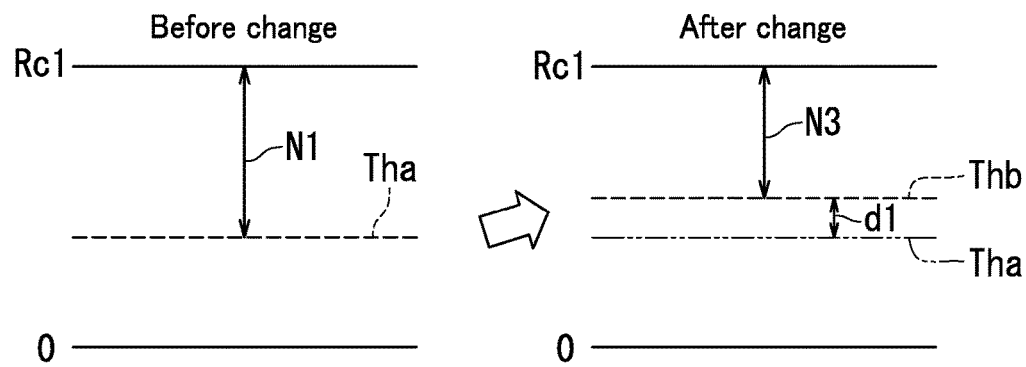
FIGS. 4A and 4B each illustrate the relationship between a pressing determination threshold and the contact resistance.
Figure 4B:
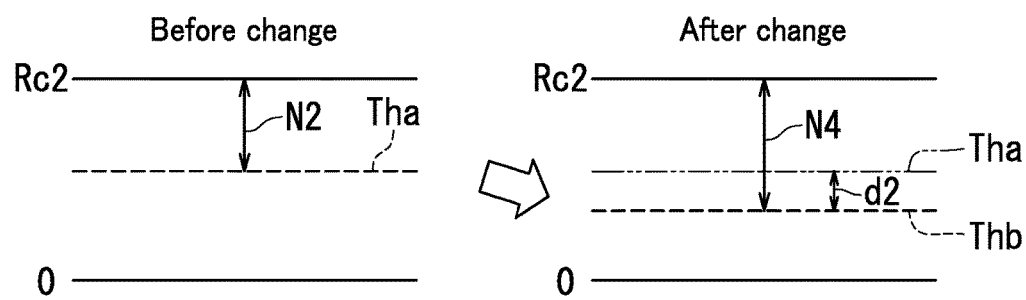

With reference to FIGS. 1-4B, a description will be made about how to change the pressing determination threshold Th in the input device 10 according to the present disclosure. FIG. 3A is a schematic diagram illustrating regions of the touch panel 50. FIG. 3B is a table presenting pressing force data stored in the storage section 30. FIGS. 4A and 4B each illustrate the relationship between the pressing determination threshold Th and the contact resistance Rc.

As illustrated in FIG. 3A, the touch panel 50 includes a plurality of regions A-I. In the present embodiment, the touch panel 50 is divided into three in the X axis direction and three in the Y axis direction. The touch panel 50 is accordingly divided into the nine regions A-I in total. The regions A-I are the same in size. The regions A, B, C, D, F, G, H, and I are located along the outer periphery of the touch panel 50. The region E is located at the center of the touch panel 50.

The storage section 30 stores therein pressed positions P and determination pressing forces N each in association with a corresponding one of the pressed positions P, as indicted in FIG. 3B. Specifically, the storage section 30 stores therein a determination pressing force N (0.31 N) and a pressed position P1 ($X_1$, $Y_1$) detected upon the pressed position detecting section 60 determining that the pressed position P1 is pressed in the touch panel 50. The storage section 30 further stores therein in association with the pressed position P1 and the determination pressing force N, the region A in which the pressed position P1 ($X_1$, $Y_1$) is located.

The storage section 30 stores therein a plurality of pressed positions P different from each other and a plurality of determination pressing forces N. The storage section 30 may store the pressed positions P and the determination pressing forces N through data acquisition prior to shipment thereof from a factory. Alternatively, the pressed positions P and the determination pressing forces N may be accumulated and stored in the storage section 30 through periodical data acquisition.

In general, a touch panel employing the resistive touch screen panel has a tendency in which a pressing force necessary for determination that the touch panel 50 is pressed increases as a pressed position is close to the edge of the touch panel 50. Specifically, a determination pressing force N is 0.31 N at a pressed position P1 ($X_1$, $Y_1$) located in the region A along the outer periphery of the touch panel 50, while a determination pressing force N is 0.05 N at a pressed position P2 ($X_6$, $Y_6$) located in the central region E of the touch panel 50.

As described above, the determination pressing force N, that is, a pressing force necessary for determination that the touch panel 50 is pressed depends on a pressed position P. The control section 20 changes the pressing determination threshold Th so that the determination pressing forces N associated with the respective different pressed positions P are equal to each other.

A method for changing the pressing determination threshold Th will be described with reference to FIGS. 4A and 4B. FIG. 4A illustrates change of the pressing determination threshold Th in the region A of the touch panel 50 illustrated in FIG. 3A. FIG. 4B illustrates change of the pressing determination threshold Th in the region E of the touch panel 50 illustrated in FIG. 3A.

In each of FIGS. 4A and 4B, the vertical axis indicates the contact resistance Rc. Contact resistances Rc1 and Rc2 each denote a value of the contact resistance Rc in a state in which the touch panel 50 is not pressed. Further, in each of FIGS. 4A and 4B, a pre-change pressing determination threshold Tha indicates a pressing determination threshold before being changed and a post-change pressing determination threshold Thb indicates a pressing determination threshold after being changed. Before the pressing determination threshold Th is changed, the pre-change pressing determination threshold Tha indicated in FIG. 4A is equal to the pre-change pressing determination threshold Tha indicated in FIG. 4B.

As illustrated in FIG. 4A, the contact resistance Rc1 in a non-pressed state is comparatively high in the region A of the touch panel 50. Therefore, a pressing force (determination pressing force) N1 necessary for determination that the touch panel 50 is pressed, that is, the pressing force (determination pressing force) N1 necessary to cause the contact resistance Rc to reach the pre-change pressing determination threshold Tha from the contact resistance Rc1 is comparatively high.

By contrast, as illustrated in FIG. 4B, the contact resistance Rc2 in the non-pressed state is comparatively low in the region E of the touch panel 50. Therefore, a pressing force (determination pressing force) N2 necessary for determination that the touch panel 50 is pressed, that is, the pressing force (determination pressing force) N2 necessary to cause the contact resistance Rc to reach the pre-change pressing determination threshold Tha from the contact resistance Rc2 is comparatively low.

The control section 20 changes the pressing determination threshold Th so that the determination pressing forces N associated with the respective different pressed positions P are equal to each other. Specifically, as illustrate in FIG. 4A, in a region where the pressing force N1 necessary for determination that the touch panel 50 is pressed is comparatively high, the control section 20 increases the pressing determination threshold Th by an amount d1 of change from the pre-change pressing determination threshold Tha to the post-change pressing determination threshold Thb. A pressing force N3 after change necessary for determination that the touch panel 50 is pressed accordingly becomes smaller than the pressing force N1 before change necessary for determination that the touch panel 50 is pressed. The control section 20 determines the amount d1 of change according to the magnitude of the determination pressing force N1 and changes the pressing determination threshold Th.

By contrast, as illustrate in FIG. 4B, in a region where the pressing force N2 necessary for determination that the touch panel 50 is pressed is comparatively low, the control section 20 reduces the pressing determination threshold Th by an amount d2 of change from the pre-change pressing determination threshold Tha to the post-change pressing determination threshold Thb. A pressing force N4 after change necessary for determination that the touch panel 50 is pressed is accordingly greater than the pressing force N2 before change necessary for determination that the touch panel 50 is pressed. The control section 20 determines the amount d2 of change according to the magnitude of the determination pressing force N2 and changes the pressing determination threshold Th.

In the above configuration, adjustment of the pressing determination threshold Th in each of the regions A-I can equalize the pressing forces N associated with the respective different pressed positions P. In the present embodiment, the pressing force N3 is equal to the pressing force N4.

Preferably, the control section 20 calculates an average pressing force indicating an average of the determination pressing forces N stored in the storage section 30. The control section 20 preferably changes the pressing determination threshold Th according to the average pressing force. Change of the pressing determination threshold Th according to the average pressing force can enable the control section 20 to appropriately change the pressing determination threshold Th in correspondence with a pressed position P.

As described with reference to FIGS. 1-4B, the control section 20 of the input device 10 changes the pressing determination threshold Th in correspondence with a pressed position P according to the pressed positions P and the determination pressing forces N stored in the storage section 30. As a result, variation on position-by-position basis in pressing force necessary for determination that the touch panel 50 is pressed can be reduced.

The control section 20 of the input device 10 changes the pressing determination threshold Th so that the determination pressing forces N associated with the respective different pressed positions P are equal to each other. In the above configuration, the touch panel 50 can recognize user pressing by equal force at any location in the touch panel 50. Therefore, user's strange feeling in operation can be reduced.

Figure 5:
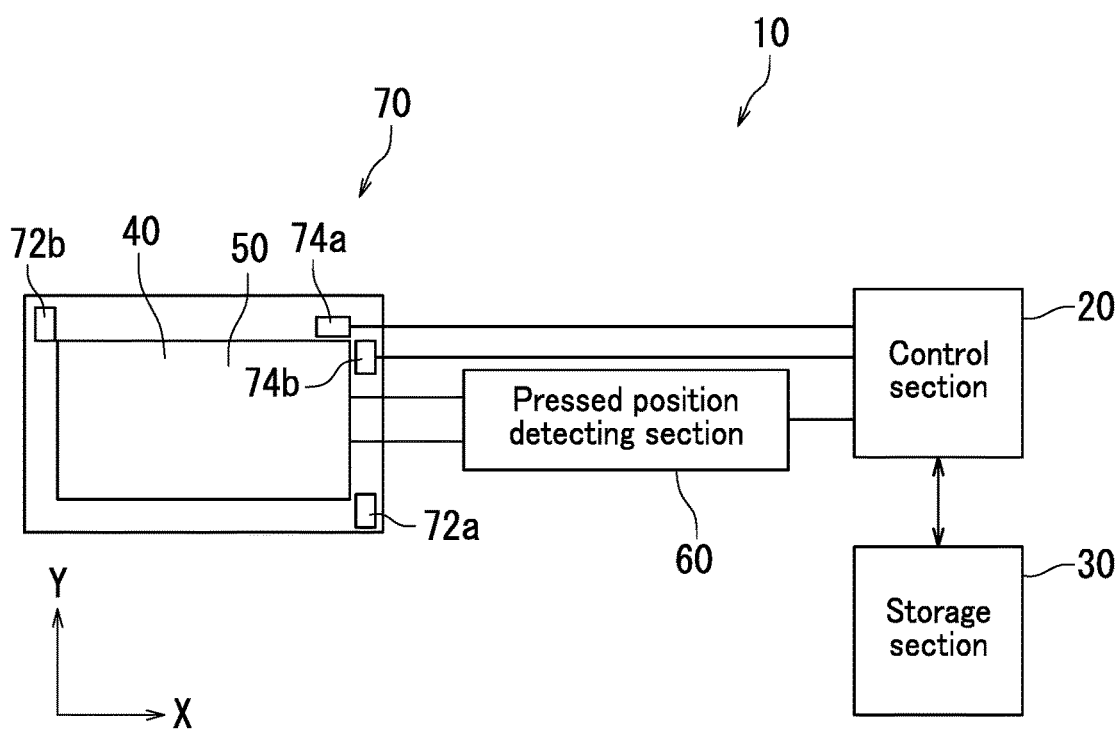
FIG. 5 is a block diagram of the input device according to the embodiment of the present disclosure.

With reference to FIG. 5, a description will be made further about the input device 10 according to the embodiment of the present disclosure. FIG. 5 is a block diagram of the input device 10 according to the embodiment of the present disclosure.

The input device 10 includes the control section 20, the storage section 30, the display section 40, the touch panel 50, the pressed position detecting section 60, and the pressing force detecting section 70. The pressed position detecting section 60 may be a touch panel controller, for example.

The pressing force detecting section 70 in the present embodiment detects a determination pressing force N based on surface acoustic waves. The pressing force detecting section 70 includes an X transmitter 72a, a Y transmitter 72b, an X receiver 74a, and a Y receiver 74b.

The X transmitter 72a is disposed on the lower right corner of the touch panel 50. The Y transmitter 72b is disposed on the upper left corner of the touch panel 50. The X receiver 74a is disposed on the upper right corner of the touch panel 50. The Y receiver 74b is disposed on the upper right corner of the touch panel 50.

The X transmitter 72a transmits ultrasonic waves as surface acoustic waves in the X axis direction. The surface acoustic waves transmitted from the X transmitter 72a are reflected by a reflection array (not illustrated) and propagates on the touch panel 50. The X receiver 74a receives the surface acoustic waves reflected by the reflection array. The surface acoustic waves traveling over a pressed position P decreases in strength. The amount of decrease in strength depends on a pressing force at the pressed position P. Therefore, the pressing force can be detected according to the amount of decrease in strength.

Similarly, the Y transmitter 72b transmits ultrasonic waves as surface acoustic waves in the Y axis direction. The surface acoustic waves transmitted from the Y transmitter 72b are reflected on a reflection array (not illustrated) and propagate on the touch panel 50. The Y receiver 74b receives the surface acoustic waves reflected by the reflection array. The surface acoustic waves traveling over a pressed position P decreases in strength. The amount of decrease in strength depends on a pressing force at the pressed position P. Therefore, the pressing force can be detected according to the amount of decrease in strength.

Figure 6:
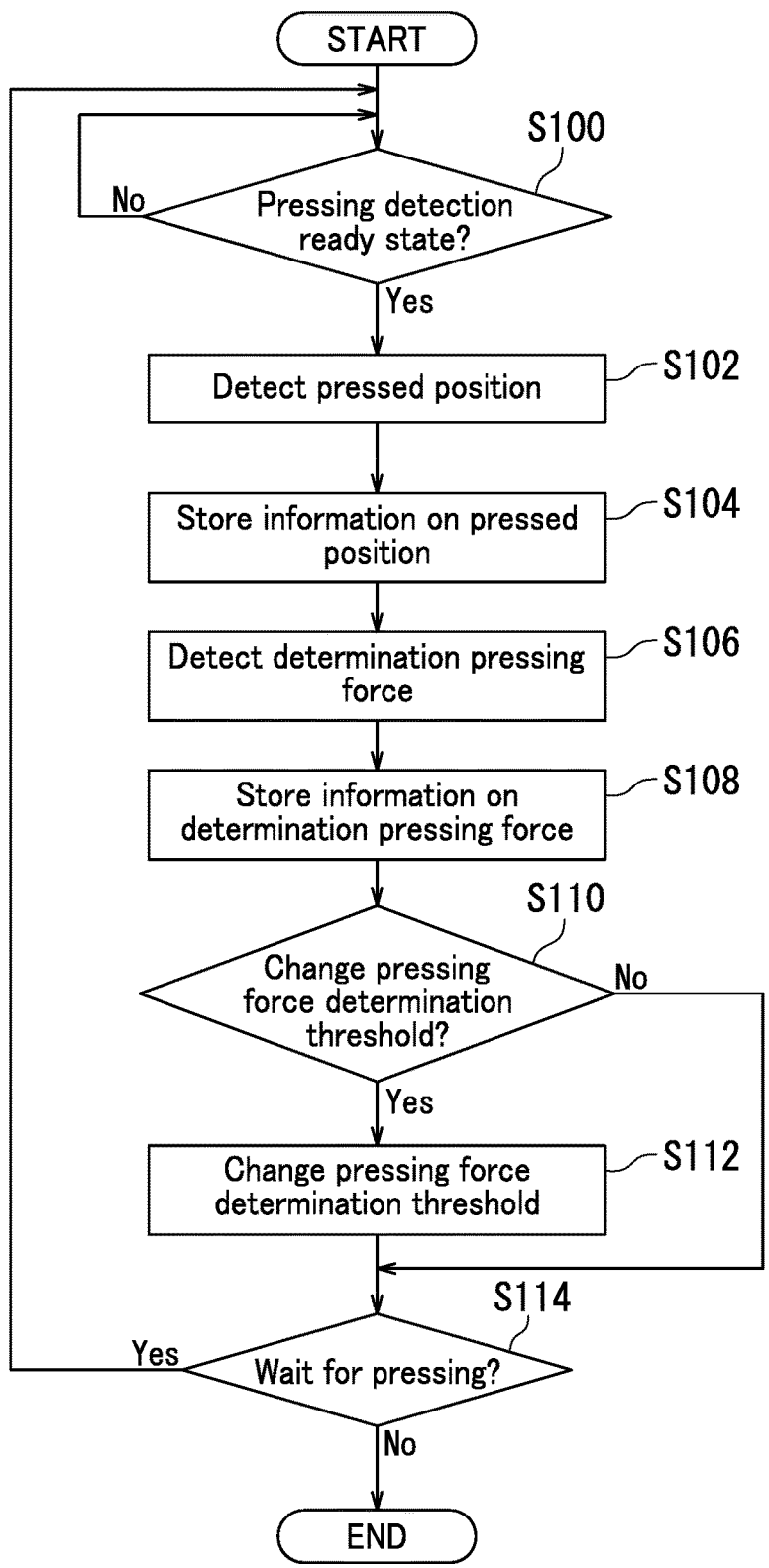
FIG. 6 is a flowchart depicting a method for changing the pressing determination threshold in the input device according to the embodiment of the present disclosure.

With reference to FIGS. 1-6, a description will be made about a method for changing the pressing determination threshold Th in the input device 10 according to the present disclosure. FIG. 6 is a flowchart depicting the method for changing the pressing determination threshold Th in the input device 10 according to the embodiment of the present disclosure.

Step S100: The control section 20 determines whether or not the touch panel 50 is in a pressing detection ready state. The pressing detection ready state is a state in which the touch panel 50 has been initialized by the control section (CPU) 20 and enters into a state in which a pressing is recognizable. When the touch panel 50 is in the pressing detection ready state (Yes at Step S100), the routine proceeds to Step S102. When the touch panel 50 is not in the pressing detection ready state (No at Step S100), the routine returns to Step S100 so that Step S100 is repeated until the touch panel 50 becomes in the pressing detection ready state.

Step S102: In response to a user pressing the touch panel 50, the pressed position detecting section 60 detects a pressed position P. The routine then proceeds to Step S104.

Step S104: The control section 20 stores into the storage section 30 information indicating the pressed position P detected by the pressed position detecting section 60. Then, the routine proceeds to Step S106.

Step S106: The pressing force detecting section 70 detects a determination pressing force N at a time when the pressed position detecting section 60 determines the pressing. The routine then proceeds to Step S108.

Step S108: The control section 20 stores into the storage section 30 information indicating the determination pressing force N in association with the pressed position P detected at Step S104 by the pressed position detecting section 60. The routine then proceeds to Step S110.

Step S110: The control section 20 determines whether or not to change the pressing determination threshold Th. Upon the control section 20 determining to change the pressing determination threshold Th (Yes at Step S110), the routine proceeds to Step S112. By contrast, upon the control section 20 determining not to change the pressing determination threshold Th (No at Step S110), the routine proceeds to Step S114.

Step S112: The control section 20 changes the pressing determination threshold Th in correspondence with the pressed position P according to the pressed position P and the determination pressing force N stored in the storage section 30.

Step S114: The control section 20 determines whether or not the touch panel 50 waits for a pressing. When the touch panel 50 waits for a pressing (Yes at Step S114), the routine returns to Step S100. When the touch panel 50 does not wait for a pressing (No at Step S114), the routine ends.

Figure 7:
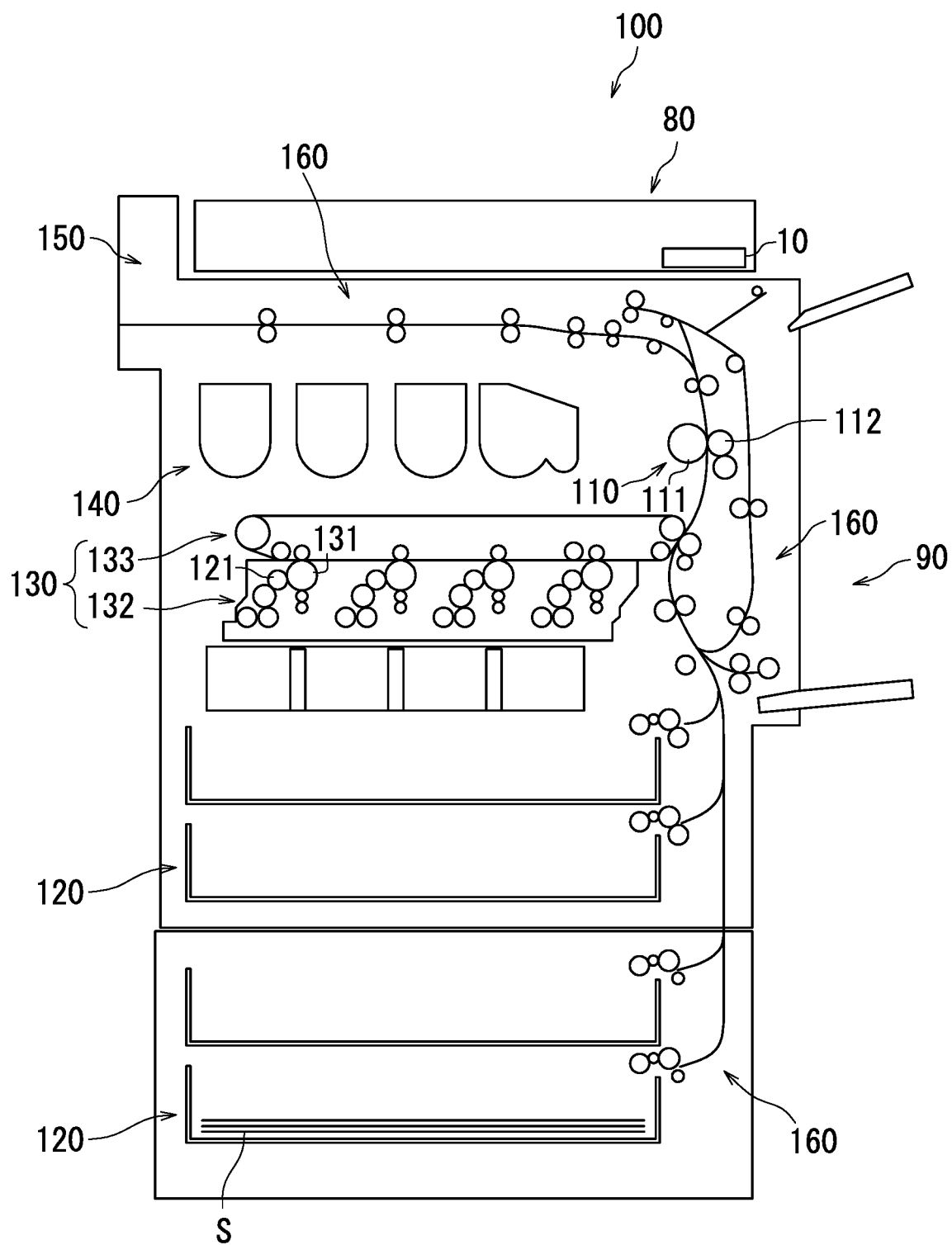
FIG. 7 is a schematic illustration of an image forming apparatus according to an embodiment of the present disclosure.

With reference to FIGS. 1 and 7, an image forming apparatus 100 will be describe that is an example of an electronic device including an input device according to the present disclosure. FIG. 7 is a schematic diagram illustrating the image forming apparatus 100 according to an embodiment of the present disclosure. The image forming apparatus 100 may be a copier, a printer, a facsimile machine, or a multifunction peripheral having the functions of the copier, the printer, and the facsimile machine.

The image forming apparatus 100 includes an input device 10, an image reading section 80, and an image forming section 90. The image forming section 90 includes a fixing device 110, a sheet feed cassette 120, an imaging section 130, a toner replenishment device 140, a sheet ejecting section 150, and a sheet conveyance section 160. The image forming apparatus 100 operates according to information input through the input device 10. The input device 10 corresponds to the input device 10 described with reference to FIG. 1. The display section 40 of the input device 10 displays an operation menu. When the touch panel 50 of the input device 10 is pressed by a user's finger, the display section 40 receives a user requesting operation. The input device 10 can recognize the pressing by an equal pressing force at any location in the touch panel 50. Therefore, user's strange feeling in operation can be reduced.

The sheet feed cassette 120 accommodates a sheet S for printing. In printing, the sheet S in the sheet feed cassette 120 is conveyed by the sheet conveyance section 160 and ejected from the sheet ejecting section 150 via the imaging section 130 and the fixing device 110.

The imaging section 130 forms a toner image on the sheet S. The imaging section 130 includes a photoreceptor 131, a developing device 132, and a transfer device 133.

An electrostatic latent image is formed on the photoreceptor 131 through laser irradiation, for example. The laser is irradiated based on electronic signals representing a document image generated by the image reading section 80. The developing device 132 includes a development roller 121. The development roller 121 develops the electrostatic latent image by supplying toner to the photoreceptor 131 to form a toner image on the photoreceptor 131. The toner is supplied from the toner replenishment device 140 to the developing device 132.

The transfer device 133 transfers the toner image formed on the photoreceptor 131 to the sheet S.

The fixing device 110 applies heat and pressure to the sheet S using a fixing member 111 and a pressure member 112 to fix the unfixed toner image formed by the imaging section 130, thereby fixing the toner image to the sheet S.

The embodiments of the present disclosure have been described so far with reference to FIGS. 1-7. The present disclosure is not limited to the above embodiments, and a wide range of alterations can be made to the embodiments so long as such alterations do not deviate from the intended scope of the present disclosure (e.g., (1) to (4) below). The drawings are schematic illustrations that emphasize elements of configuration in order to facilitate understanding thereof. Therefore, properties of each of the elements, such as thickness, length, and number thereof, may differ from actual properties of the element. The properties of each of the elements, such as material, shape, and dimension thereof described above are mere examples and not limited specifically. A wide range of variations of the properties can be made to the embodiments so long as such variations do not deviate from the intended scope of the present disclosure.

(1) In the input device 10 described with reference to FIGS. 1-6, the touch panel 50 is divided into the nine regions, which however should not be taken to limit the present disclosure. The touch panel 50 may be divided into four or sixteen regions.

(2) In the input device 10 described with reference to FIGS. 1-6, the regions divided in the touch panel 50 are the same in size, which however should not be taken to limit the present disclosure. The regions divided in the touch panel 50 may differ in size.

(3) The input device 10 described with reference to FIGS. 1-6 employs an analog resistive touch screen panel for detecting a pressed position P in the touch panel 50. Alternatively, the input device 10 may employ a matrix resistive touch screen.

(4) The image forming apparatus is described with reference to FIG. 7 as an example of an electronic device including the input device 10. However, the present disclosure is not limited to the image forming apparatus including the input device 10. For example, the electronic device including the input device 10 may be a smartphone, a tablet computer, or a personal computer including a touch panel.

What is claimed is:

1. An input device comprising:
 a display section configured to display a screen;
 a touch panel with a plurality of electrodes mounted on the display section and configured to detect a resistance between two electrodes among the plurality of electrodes;
 a pressed position detecting section configured to determine whether or not the touch panel is pressed according to the resistance between the two electrodes and a pressing determination threshold and detect a pressed position where the touch panel is pressed;
a pressing force detecting section configured to detect a determination pressing force at a time when the pressed position detecting section determines that the touch panel is pressed;
a storage section that stores therein the pressed position and the determination pressing force in association with the pressed position; and
a control section configured to change the pressing determination threshold in correspondence with the pressed position according to the pressed position and the determination pressing force stored in the storage section, wherein
the storage section stores therein a plurality of pressed positions different from each other and a plurality of determination pressing forces each in association with a corresponding one of the pressed positions, and
the control section changes the pressing determination threshold so that the determination pressing force associated with the pressing position is equal to a determination pressing force associated with another pressed position.

2. The input device according to claim 1, wherein
the storage section stores therein a plurality of pressed positions different from each other and a plurality of determination pressing forces each in association with a corresponding one of the pressed positions, and
the control section calculates an average pressing force indicating an average of the plurality of determination pressing forces stored in the storage section and changes the pressing determination threshold based on the average pressing force.

3. The input device according to claim 1, wherein
the control section determines an amount of change of the pressing determination threshold according to magnitude of the determination pressing force.

4. The input device according to claim 1, wherein
the touch panel includes a plurality of regions, and
the control section changes the pressing determination threshold in correspondence with the regions.

5. The input device according to claim 4, wherein
the plurality of regions includes four, nine, or sixteen regions.

6. The input device according to claim 4, wherein
the plurality of regions are the same in size.

7. The input device according to claim 4, wherein
the plurality of regions differ in size.

8. An electronic device comprising the input device according to claim 1.

9. An input device comprising:
a display section configured to display a screen;
a touch panel with a plurality of electrodes mounted on the display section and configured to detect a resistance between two electrodes among the plurality of electrodes;
a pressed position detecting section configured to determine whether or not the touch panel is pressed according to the resistance between the two electrodes and a pressing determination threshold and detect a pressed position where the touch panel is pressed;
a pressing force detecting section configured to detect a determination pressing force at a time when the pressed position detecting section determines that the touch panel is pressed;
a storage section that stores therein the pressed position and the determination pressing force in association with the pressed position; and
a control section configured to change the pressing determination threshold in correspondence with the pressed position according to the pressed position and the determination pressing force stored in the storage section, wherein
the storage section stores therein a plurality of pressed positions different from each other and a plurality of determination pressing forces each in association with a corresponding one of the pressed positions, and
the control section calculates an average pressing force indicating an average of the plurality of determination pressing forces stored in the storage section and changes the pressing determination threshold based on the average pressing force.

10. The input device according to claim 9, wherein
the control section determines an amount of change of the pressing determination threshold according to magnitude of the determination pressing force.

11. The input device according to claim 9, wherein
the touch panel includes a plurality of regions, and
the control section changes the pressing determination threshold in correspondence with the regions.

12. The input device according to claim 11, wherein
the plurality of regions includes four, nine, or sixteen regions.

13. The input device according to claim 11, wherein
the plurality of regions are the same in size.

14. The input device according to claim 11, wherein
the plurality of regions differ in size.

15. An electronic device comprising the input device according to claim 9.

* * * * *